W. H. PORTER.

Assignor to THE PORTER DROP CABINET COMPANY.

COMBINED DESK AND TYPE WRITER CABINET.

No. 10,924. Reissued Apr. 24, 1888.

WITNESSES

Al. C. Newman.
Enos S. Newman

INVENTOR.

By his Attorneys William H. Porter
Baldwin Hopkins & Peyton.

UNITED STATES PATENT OFFICE.

WILLIAM H. PORTER, OF WASHINGTON, DISTRICT OF COLUMBIA, ASSIGNOR TO THE PORTER DROP CABINET COMPANY, OF NEW YORK, N. Y.

COMBINED DESK AND TYPE-WRITER CABINET.

SPECIFICATION forming part of Reissued Letters Patent No. 10,924, dated April 24, 1888.

Original No. 365,275, dated June 21, 1887. Application for reissue filed February 7, 1888. Serial No. 263,290.

*To all whom it may concern:*

Be it known that I, WILLIAM H. PORTER, a citizen of the United States, residing at Washington, in the District of Columbia, have invented certain new and useful Improvements in Combined Desk and Type-Writer Cabinets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1:
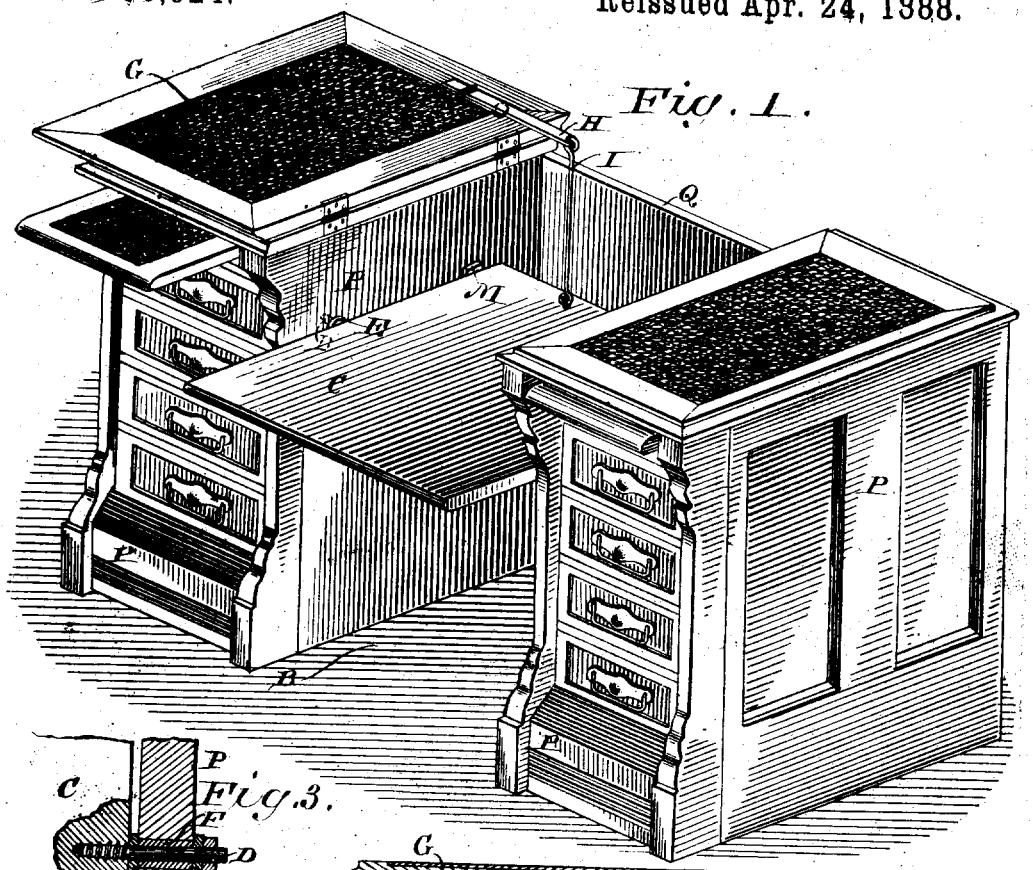
Figure 3:
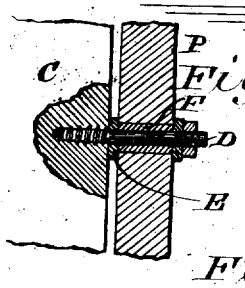
Figure 2:
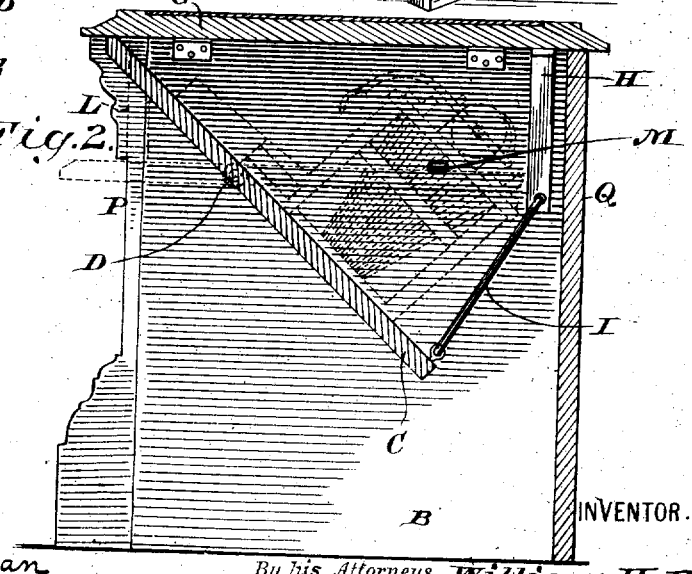

Figure 1 is a perspective view of my improved desk and type-writer cabinet open. Fig. 2 is a vertical sectional view of the same closed, and Fig. 3 is a detail view of parts of the desk detached.

Since the perfection and adoption of type-writing machines they have become an almost necessary feature in every well-regulated office; but, like all machinery, they must be kept as free from dust as possible to give the best results. To do this requires that they must be covered, and to provide such a cover as shall be convenient, neat, and tidy has long been the desire of business men and the subject of the inventive mind. As a stand and a receptacle for stationery, &c., must be provided as well as a cover, I have combined them all in a cabinet, which can also be utilized as an ordinary desk, and at the same time in such a manner that the change from the one to the other is quickly and easily made.

This invention therefore relates to that class of desks in which, when the top is closed, the machine is lowered, and when it is opened the machine is raised into position.

The object of this invention is to provide a simple and convenient convertible type-writer table and desk for ordinary uses. The first step for the accomplishment of such an object was to provide and organize together the essential parts of a desk-body. This I have endeavored to do with the minimum number of parts arranged in the most advantageous way, having in view the utmost simplicity and economy of construction. Accordingly, my invention primarily consists, as a foundation or body for a convertible desk and type-writer table, of the organization together of two fixed end supporting parts and a fixed back part or panel connecting them, the two end parts having an entire open space between them, except the mere connection of the fixed back part, and a platform pivotally secured between the two end parts, so as, in conjunction with the back part, to make their connection firm and render the whole body strong. The central or frontal connection of the end parts serving, also, as a pivotal support for the type-writer, the elemental parts are thus reduced to the minimum in number and cost.

As the plan of pivoting and turning the moving parts for the converting operation is much the most simple, economical, and desirable, I adhere to that closely in the design of my improvements. Accordingly, my invention further consists, in a convertible desk and type-writer table, of the organization together of two fixed end supporting parts, a fixed back part connecting the two end supporting parts, a cover in sections, the middle section being hinged to one of the end sections, and a platform below the hinged cover and between and pivoted to the fixed end parts, so that by turning the middle cover-section and the platform on their respective pivotal centers of motion a combined type-writer table and desk, or a common desk only, can be formed of the device at will. Such a simple fundamental structure provides for supporting a type-writer at the proper elevation (or depression rather) for advantageous operation and provides for a complete desk of ordinary pattern. It also provides a desk for use by a person at the same time that the type-writer is being used, because the hinged middle section of the cover when turned over to one side forms a good desk-top of itself, which is sometimes very convenient in connection with a type-writer table.

The simple organization just described, embracing only the main parts of such a convertible device, is not only useful in itself, but it constitutes an excellent foundation for applying suitable flexible mechanism to connect the hinged middle cover-section and the platform, so that when the former is turned on its hinges the platform will be turned on its pivot simultaneously, and the device can thus by one movement of the hinged section of the cover instantly be converted into a type-writer table and desk or a common office desk only. Accordingly, a part of my invention consists in the organization together, in a convertible desk and type-writer table, of two fixed end supporting parts, a fixed back part connecting the two end supporting parts, a cover in sections, the middle section being hinged to one of the end sections, a platform below the hinged cover and between and pivoted to the fixed end parts, and suitable flexible mechanism connecting the hinged middle cover-section and the platform, so that they may be moved simultaneously to form a combined desk and type-writer table or a desk only, as desired.

By providing a platform of sufficient width and by pivoting it properly, as shown, between the fixed supporting end parts of the structure I gain three distinct advantages. First, I am enabled to conveniently close the front opening over the platform by the platform itself when its inner end is tilted down; second, I secure a projection of the platform out beyond the front of the fixed end parts when it is tilted up, which is very desirable for the purpose of a type-writer table; and, third, by pivoting the platform not far from its middle I nearly balance it and the weight it carries, so that the center of gravity and the center of motion are nearly coincident, which makes the tilting motion very easy, and prevents jarring when the limit of movement in either direction is reached. The pivot being located away from the edge of the platform, the type-writer can be adjusted to balance very well even when the pivot is considerably at one side of the center, and as there is no sliding movement of the platform back and forth in tilting it the minimum of resistance to its movements is secured at the same time with the other advantages named. Accordingly, another part of my invention consists in the organization together, in a convertible desk and type-writer table, of two fixed supporting end parts, a fixed back part connecting the two end parts, and a platform between and pivoted to the fixed end parts, which projects out beyond the front of the end parts when in position for supporting the type-writer, and which comes up flush with the bottom of the table-cover, and so closes the front opening in the upper part of the structure neatly, when the device is converted into a mere desk.

My invention further consists in the improved construction and combination of parts of such a convertible device, as will be hereinafter more particularly described, and pointed out in the claims.

In the accompanying drawings, in which the same letters of reference indicate corresponding parts in all the figures, Fig. 1 represents the desk or cabinet body, which consists of the two fixed supporting end parts, P P, and the fixed back part or panel, Q, rigidly connecting the end parts together at the rear, and which can be of any desired size and degree of ornamentation, and which can be provided with drawers at one or both ends. In such a desk-body a space, B, is left between the fixed supporting end parts, within which a pivoted platform, C, is secured. To pivot the platform I provide a short bolt, D, at each side of the platform, screw-threaded at each end, one end being screwed into the platform and the other end passed through a suitable hole in the inner panel of the end part, P, and provided with a nut upon its opposite end.

To keep the edges of the platform from rubbing against the inner panels as it is being swung up and down when opening and closing the desk, a washer, E, is placed between them at each pivot. These washers are preferably made of some material which is a non-conductor of sound—as rubber or leather—and thus help to deaden the sound of the machine when being operated. Similar washers can also be used upon the outer ends of the bolts between the nuts and the panels, and a thimble or sleeve, F, of the same kind of material, can be placed around each pivot in the hole through the panel, thus almost completely insulating the platform acoustically from the rest of the desk.

Instead of the two bolts for pivots, a solid bar can be passed entirely across the space and have its ends secured in the panels in the same manner as the bolts D. This construction adds great strength to the front of the desk, as the nuts at the ends of the pivots enable the panels to be drawn tightly against the sides or edges of the platform, and which will prevent the two ends of the desk from being drawn away from each other in moving the desk, which would have a tendency to break them apart if they were not properly braced or secured together. By screwing the ends of the short bolts into the platform, the platform itself takes the place of the continuous bar from panel to panel. By securing the panels or ends of the desk to the edges of the platform in this manner the ordinary cross-piece is dispensed with, which thus enables the operator to secure a closer position to the desk when closed than if the cross-piece were used, as it would necessarily be so low as to be in the way. Besides, it is a matter of saving in the construction of the desk-body to dispense with the cross-piece.

The cover or top of the desk-body is composed of three sections, the middle one of which, G, is secured to the edge of one of the other sections by means of blind or the ordinary hinges, so as to occupy the space between the two other sections, which are secured over the drawers at each end when closed, or to lie upon the top of the section to which it is hinged when open. By finishing this middle section upon both sides it will make a neat appearance when closed or open, and can also be used for any of the ordinary purposes of a desk in either position. The ordinary drawers or slides can be placed at each side underneath the end sections of the top or cover, which can be used either when using the device as a cabinet or as a desk.

It is desirable to provide some suitable flexible mechanism to connect the hinged middle section, G, with the pivoted platform C, so that the turning of the middle section either way will properly raise or lower the platform. Accordingly, secured at one end to the under side of this middle swinging section, G, by means of a hinge-joint is the rod H, to the other end of which is hinged the rod I, which in turn is pivotally secured to the rear portion of the platform C. The bar H is secured to the section of the cover G at such a distance from its hinge edge that when the cabinet is open the inner end of the bar will project a slight distance beyond that edge. This will cause the rod I to occupy more nearly a vertical position at all times, and will also cause the portion of the bar H that projects beyond the edge to act as a lever in raising the platform when the desk is being opened, using the hinge between the covers as a fulcrum. When the section G is lying flat upon the end section when the desk is open, its weight is sufficient, owing to the great advantage it has in leverage, to hold up the weight of the machine on the platform without any catches, hooks, or other means of support.

As the machine cannot be operated as conveniently when placed as high as an ordinary desk, the platform is placed at some distance from the top of the panels, so that when open the machine will be of the right height for convenience; but when the desk is closed it will be the same as an ordinary desk, both in appearance and in convenience, the cover being at the usual height. As this placing of the platform below the level of the top of the desk would leave a space between the front of it and the cover or top when closed, which would admit dust, &c., and also make the desk have an unfinished appearance, I place the pivots on which the platform swings at such a distance from the front as that when the rear end of the platform has been let down to its lowest point the front end has been raised until it just touches the lower side of the cover, thus making a close joint and enabling the operator to lock the desk by means of the ordinary lock and key. Another advantage secured by this construction is that when the platform is swung into its horizontal position ready for use its front edge is caused to project some distance in front of the desk, which will enable the operator to draw the machine partly out from between the ends of the desk.

The platform can be made long enough so that when in its horizontal position its rear end will extend to the back of the desk.

To give the desk more the appearance of an ordinary desk when closed, a pendent leaf, L, (shown in dotted line in Fig. 2,) can be hinged to the under side of the platform near its front edge, which will hang down and give the appearance of the ordinary drawer, the lower edge of which must be allowed to swing freely, so as not to interfere with the person of the operator when using the machine or desk.

To prevent the machine from slipping down the platform when the desk is closed, it is secured by means of the ordinary stops or blocks, and to prevent damage to the machine by raising the platform quickly stop-blocks M can be secured to the inner panels at the proper height, against which the platform will strike when it is raised. A button of felt or leather can be placed upon the swinging top section, G, in such a position that when the desk is opened the bar H will strike upon the button instead of the cover, and thus the sound will be deadened. Instead of hinge-joints being used to secure the end of this bar to the cover, or the ends of the bar and rod together, the ordinary hook-and-eye joint can be used, the only requisite being that sufficient play be given to the parts to prevent binding or breaking as the desk is being closed or opened.

The swinging top and platform can be used upon a desk having drawers only at one side as well as at both. In this style the hinged section will answer all the purposes of what is called a "drop-leaf" in extending the top, without adding to the cost of the desk, except that incidental to the making of the top in sections and hinging one section at its edge, and will possess all the advantages of covering the machine, as well as with the drawers upon both sides of the desk. As in this style the edge of the middle section is hinged to a narrow end section of the cover in the same manner as is shown, it has not been illustrated.

It is evident that in a desk having one section of the cover hinged to swing over laterally, it can be opened and closed easily and quickly by the operator without rising from his seat, or by an operator who has not such an abundance of muscular power as to be able to operate it if he had to reach out at arm's length and force it up and down; but with my improvements the power is applied at the most advantageous point and in the most advantageous way, as the cover must swing through a half-circle in raising the platform and machine a few inches, and when the desk is closed it can be used for all the ordinary uses of a flat-top desk, and by making the top inclined have all the advantages of the inclined-top desk.

Having thus described my invention, I claim and desire to secure by Letters Patent of the United States—

1. In a convertible desk and type-writer table, the combination, to form the body of the cabinet, of the fixed supporting end parts, P P, the fixed back part, Q, connecting the two end parts at the back, and a platform, C, pivoted between the two end parts forward of the part Q, so as to secure them to each other, substantially as set forth.

2. In a convertible desk and type-writer table, the combination of fixed supporting end parts, P P, a fixed back part, Q, connecting the two end parts, a cover in sections, the middle section, G, being hinged to one of the end ones, so as to form an independent desk-top when turned out, and a platform, C, below the hinged cover section between and pivoted to the fixed end parts, substantially as set forth.

3. In a convertible desk and type-writer table, the combination of fixed supporting end parts, P P, a fixed back part, Q, connecting the two end parts, a cover in sections, the middle section, G, being hinged to one of the end ones, so as to form an independent desk-top when turned out, a platform, C, below the hinged cover-section between and pivoted to the fixed end parts, and flexible mechanism connecting the parts C and G, so that they may be moved simultaneously, substantially as set forth.

4. In a convertible desk and type-writer table, the combination of fixed supporting end parts, P P, a fixed back part, Q, connecting the two end parts, and a platform, C, between and pivoted to the fixed end parts below their tops and projecting out beyond the front of the end parts, substantially as set forth.

5. In a combined desk and type-writer cabinet, the combination, with a desk having its top in sections, the middle one of which is hinged to another, so as to swing to one side, of a platform pivotally secured intermediate its ends below said swinging section, the front end of which is adapted to be raised by turning on its fixed pivot, (without the platform moving bodily toward the rear of the desk,) so as to touch said swinging section when the desk-top is closed, and means, substantially as described, for connecting said platform and said swinging section.

6. In a combined desk and type-writer cabinet, the combination, with a desk having its top in sections, one of which is hinged to another, of a platform pivotally secured below said swinging section, the front end of which is adapted to project in front of the desk when open or in a horizontal position, and means, substantially as described, for connecting said platform and said swinging section.

7. In a combined desk and type-writer cabinet, the combination of a desk the ends of which are entirely disconnected at their front portions and each provided with a hole, a sleeve of non-sound-conducting material within each of said holes, a platform between said ends, a pivot upon each edge or side of said platform and projecting through said sleeves in said holes, firmly securing the ends of the desk to the platform, washers of non-sound-conducting material upon said pivots and between the edges of the platform and the ends of the desk, a cover hinged above said platform, and means, substantially as described, for connecting said cover and platform.

8. In a combined desk and type-writer cabinet, the combination, with a desk having its top in sections, one of which is hinged to swing laterally, of a platform pivotally secured below said section and a jointed bar pivotally secured at its ends to said platform and said swinging section.

9. In a combined desk and type-writer cabinet, the combination, with a desk having its top in sections, one of which is hinged to swing laterally, of a platform pivotally secured below said swinging section, a bar pivotally connected at one end to said swinging section, the opposite end of which projects beyond the hinged edge of said section when the desk is open, and a rod pivotally connected with the end of said bar and with the rear portion of said platform.

10. In a combined desk and type-writer cabinet, the combination of a desk the ends of which are entirely disconnected at their front portions, and having a space between them, a pivoted platform within said space firmly secured at its sides to the said ends, a cover in sections above said platform, and means, substantially as described, for connecting one section of said cover and said platform.

WILLIAM H. PORTER.

Witnesses:
MARCUS S. HOPKINS,
BALTUS DE LONG.